United States Patent [19]

Tawil et al.

[11] Patent Number: 5,725,955
[45] Date of Patent: Mar. 10, 1998

[54] PROCESS FOR PROTECTING PRODUCTS MADE OF COMPOSITE MATERIAL CONTAINING CARBON AGAINST OXIDATION, AND PRODUCTS OBTAINED BY THE SAID PROCESS

[75] Inventors: Henri Tawil, Le Bouscat; Xavier Bernard, Margaux; jean-Claude Cavalier, Le Pian Medoc, all of France

[73] Assignee: Societe Europeenne de Propulsion, Suresnes, France

[21] Appl. No.: 256,263
[22] PCT Filed: Dec. 30, 1992
[86] PCT No.: PCT/FR92/01245
  § 371 Date: Jun. 29, 1994
  § 102(e) Date: Jun. 29, 1994
[87] PCT Pub. No.: WO93/13033
  PCT Pub. Date: Jul. 8, 1993

[30] Foreign Application Priority Data

Dec. 30, 1991 [FR] France .................. 91 16321

[51] Int. Cl.$^6$ .................................................. B32B 17/00
[52] U.S. Cl. .................. 428/408; 428/426; 428/428; 428/432; 428/699; 428/701; 428/702; 427/421; 427/422; 427/427; 427/429
[58] Field of Search .................. 428/408, 426, 428/428, 432, 699, 701, 702, 704; 427/421, 422, 427, 429; 501/55, 68

[56] References Cited

U.S. PATENT DOCUMENTS

| | | | |
|---|---|---|---|
| 4,487,804 | 12/1984 | Reven | 428/408 |
| 4,530,853 | 7/1985 | Lewallen | 427/113 |
| 4,582,751 | 4/1986 | Vasilos | 428/307.3 |
| 4,726,995 | 2/1988 | Chiu | 428/408 |
| 5,102,698 | 4/1992 | Cavalier | 427/376.1 |

FOREIGN PATENT DOCUMENTS

| | | |
|---|---|---|
| 0375537 | 6/1990 | European Pat. Off. . |
| 812740 | 4/1959 | United Kingdom . |
| WO8807506 | 10/1988 | WIPO . |

OTHER PUBLICATIONS

Chemical Abstracts, vol. 108, No. 22, May 1988, Columbus Ohio, US, p. 311, Abstract No. 191634r, JP.A, 6323036 (Showa Denko K.K.), Jan. 30, 1988.

"Oxidation Protective Coating for Polycrystalline Carbon", Ceramic Engineering and Science Proceedings, vol. 10, No. 9–10, Oct. 1989, U.S. G. Palavit et al, p. 1425.

*Primary Examiner*—Timothy Speer
*Attorney, Agent, or Firm*—Weingarten, Schurgin, Gagnebin & Hayes LLP

[57] ABSTRACT

The method comprises forming at least one external coating on the surface of the product to be protected, the coating being constituted by a composition mainly containing a mixture of phosphates, of silica, and of alumina belonging to a $P_2O_5$—$SiO_2$—$Al_2O_3$ system, and, after drying, implementing heat treatment at a temperature that is sufficient at least to transform the external coating into an insoluble cement capable of forming a self-sealing glass. The external coating is formed of a liquid suspension that is applied by spray-painting or by means of a brush, the suspension containing said mixture of phosphates, of silica, and of alumina. Prior to forming the external coating, the product may be impregnated to the core within the residual open pores of the composite material, using a liquid solution of phosphates, of sodium, and of potassium.

20 Claims, 1 Drawing Sheet

PROCESS FOR PROTECTING PRODUCTS MADE OF COMPOSITE MATERIAL CONTAINING CARBON AGAINST OXIDATION, AND PRODUCTS OBTAINED BY THE SAID PROCESS

The present invention relates to anti-oxidation protection for products made of composite material containing carbon.

So-called "thermostructural" composite materials are used for making parts that are required to exhibit good mechanical behavior when hot, in particular in the fields of braking, aviation and space. Such materials are constituted by refractory fiber reinforcement, e.g. made of carbon or of a ceramic, that is densified by a matrix, e.g. likewise carbon or a ceramic.

For applications that require the parts to spend time at high temperature in an oxidizing medium, ceramic matrix composites may be preferred to carbon matrix composites because of the poor resistance of carbon to oxidation.

Nevertheless, anti-oxidation protection remains necessary for ceramic matrix composites if they contain any carbon. This applies to composites of the carbon ceramic type in which the fiber reinforcement is made of carbon, e.g. C—SiC (carbon-silicon carbide) composites. This also applies to composites of the ceramic-ceramic type, e.g. SiC—SiC (silicon carbide-silicon carbide) including an interphase layer of carbon between the fibers and the matrix, as described in document FR-A-2 567 874.

A large amount of work has been done on anti-oxidation protection for thermostructural composites.

A known solution consists in forming a coating on the part made of composite material, which coating withstands wear and oxidation, and is generally a coating of silicon carbide (SIC) implemented by chemical vapor deposition.

Nevertheless, it is impossible in practice to make such an external coating without defects occurring, either at the moment of manufacture (pinhole defects) or else while the product is in use (cracking). The composite material is then not completely isolated from the ambient oxidizing medium.

To remedy such defects, proposals have been made to use an additional coating made of a material such as a silicate, borate, or borosilicate type glass which seals holes and cracks in the SiC coating by taking on a semi-solid state above a certain temperature.

Another known solution consists in providing internal type protection by vapor deposition of boron within the residual pores of the composite material, as described in U.S. Pat. No. 4 582 751. The fiber reinforcement of the composite material is initially porous to some extent and its pores are only incompletely blocked by the matrix material. Accessible pores therefore remain not only on the surface, but also within the bulk of the material, thus making it possible to form internal protection.

Internal type anti-oxidation protection for C—C (carbon-carbon) composite friction material is also described in document JP-A-63/023 036. Internal protection is obtained by impregnation with an aqueous solution of aluminum phosphate and by heating to 700° C. in a non-oxidizing atmosphere.

The use of aluminum phosphate for forming a coating that provides protection against oxidation is well known. Thus, document GB-A-812 740 already discloses a method of protecting graphite against oxidation by carbon dioxide, in particular for graphite used as a moderator in a nuclear reaction that is cooled by carbon dioxide, with protection being provided by a coating composition in the form of a refractory cement containing graphite powder and a binder derived from a solution of aluminum phosphate with additions of kaolin, silicon, alumina, and/or other refractory oxides.

Finally, in order to further improve protection against oxidation, document FR-A-2 640 619 proposes providing internal protection by impregnating the residual pores of the composite material by means of a liquid solution of an alkaline silicate. Impregnation is followed by a drying stage and then by a heat treatment stage which has a lining effect to form an internal protective coating on the surfaces of the open pores in the composite material, which coating constitutes a non-oxidizing refractory residue and is self-sealing. The composite material comprising the internal protection may be provided with a refractory external protective coating, in particular of silicon carbide. The external coating is formed on the surface of the product and also in the residual open pores, at least close to the surface, thereby providing an effect of blocking the internal protection.

An object of the invention is to provide a novel method of obtaining protection against oxidation by means of a composition that leaves a non-oxidizing refractory residue having the required characteristics, in particular of self-sealing. The term "self-sealing" is used herein to designate the ability of the refractory residue to form protection that is free from defects because it softens in a certain temperature range. Another object of the invention is to provide protection against oxidation that is insensitive to water.

According to the invention, this object is achieved by the fact that an external coating is formed on the ceramic surface of a product to be protected that is made of composite material, the coating being formed from a composition mainly containing a mixture of phosphates, of silica, and of alumina belonging to a $P_2O_5$—$SiO_2$—$Al_2O_3$ system, and after drying, heat treatment is performed at a temperature which is at least high enough to transform the external coating into an insoluble cement suitable for subsequently forming a self-sealing glass.

The composition formed essentially of the mixture of phosphate, of alumina, and of silica is put into place on a ceramic external surface of the composite material. When the composite material has a ceramic matrix the external surface is constituted by the surface portion of the matrix. The same applies to a composite material having a combined carbon/ceramic matrix, the ceramic phase of the matrix being on the outside. For a composite material that has a carbon matrix, it is necessary to begin by forming an external coating layer made of ceramic, e.g. of silicon carbide.

The external coating is advantageously formed by spray-painting or by brush application of the composition in suspension in a liquid such as water. It is thus easy to implement and penetrates readily into the pores in the surface of the product, thereby promoting bonding of the external protection.

After the external coating has been transformed into cement, the product can be left in that state since the cement provides effective protection. The invention also relates to such a protected product made of composite material. The transformation of the cement into a self-sealing glass than takes place while the product is in use, when the temperature to which it is exposed reaches the softening point.

Nevertheless, the cement could alternatively be transformed into glass during manufacture of the product.

Unlike the coating described in above-mentioned document GB-A-812 740, it will be observed that the external coating in this case is a cement that is designed to form a glass, and not a refractory cement which ought not normally to be subjected to transformation up to its temperature of use.

An advantage of the method of the invention stems from the fact that the external protective coating made in this way is insoluble in water.

In addition to the mixture of phosphates, silica, and alumina, together with water, the composition may also include various refractory oxides, in particular alkali oxides such as sodium oxide or potassium oxide, boron oxide, and metallic oxides such as zinc oxide. The addition of certain oxides, in particular alkaline earths, makes it possible to adjust the temperature range within which the glass formed by the external protection has a viscous state suitable for performing the self-sealing function.

The mixture of phosphates, of silica, and of aluminum $P_2O_5$—$SiO_2$—$Al_2O_3$ represents the major portion of the composition of the coating, preferably 50% to 90% by weight of said composition. In the mixture, there is preferably more $P_2O_5$ than $SiO_2+Al_2O_3$ with the ratio by weight of $P_2O_5$ over $SiO_2+Al_2O_3$ lying, for example, in the range 1 to 1.3. Also, preferably, the quantities by weight of these three main ingredients are such that the ratio of $SiO_2$ over $Al_2O_3$ lies in the range 0.6 to 1, the ratio of $SiO_2$ over $P_2O_5$ lies in the range 0.35 to 0.45, and the ratio of $Al_2O_3$ over $P_2O_5$ lies in the range 0.40 to 0.55. Although $SiO_2$ is a minority ingredient in the self-sealing glass obtained by exposure to heat, it is the $SiO_2$ that imposes the vitreous system. A silica glass is thus obtained. Compared with known phosphate glasses, a silica glass used for external protection presents improved behavior because of its greater temperature stability and its smaller sensitivity to moisture.

The various added oxides preferably constitute between 10% to 50% by weight of the composition, with 10% to 30% by weight being alkali oxides.

The quantity of added water is adjusted as a function of the viscosity desired for use of the suspension.

In a preferred implementation of the invention, prior to forming the external coating for protection against oxidation, the product is impregnated to the core via the residual open pores of the composite material using a liquid solution of at least one alkali phosphate. After drying, heat treatment performed at a sufficiently high temperature enables the surfaces of the open pores in the composite material to be lined with an internal protective coating that is refractory, non-oxidizing, and self-sealing. This heat treatment for lining purposes (vitrification) may be performed immediately after impregnating the product and drying it, prior to forming the external coating. It is also possible to form the external coating after the product has been impregnated and dried, but without intermediate heat treatment, the surfaces of the pores then being lined by heat treatment after the external coating has been formed.

Advantageously, impregnation to the core is performed by a liquid solution of sodium and potassium phosphates, after heat treatment for lining purposes, thereby giving internal protection that exhibits little sensitivity to water. In addition, the internal protection has a softening temperature that is not very high, thereby increasing the effectiveness of the overall protection over a range of temperatures running from about 400° C. to about 600° C.

In the solution used for impregnating the product to the core, the respective quantities of sodium phosphate and of potassium phosphate are in proportions preferably lying in the range 4/1 to 2/1. The quantity of added water is adjusted as a function of the viscosity desired for use of the solution.

Impregnation is performed at least initially in a vacuum by immersing the product in a bath of the liquid solution of phosphates, inside an enclosure where the pressure is low, e.g. about 30 torrs ($4 \times 10^3$ N/m2). Immersion is continued for several tens of minutes, e.g. for about 1 hour. The stage of vacuum impregnation may be followed by a stage of impregnation under pressure seeking to improve the incorporation of the solution to the core of the product, within the accessible pores of the composite material.

The effectiveness of the protection against oxidation provided by the method of the invention is demonstrated by the examples described below.

BRIEF DESCRIPTION OF THE DRAWINGS

Reference is made to the accompanying drawings, in which.

Figure 1:
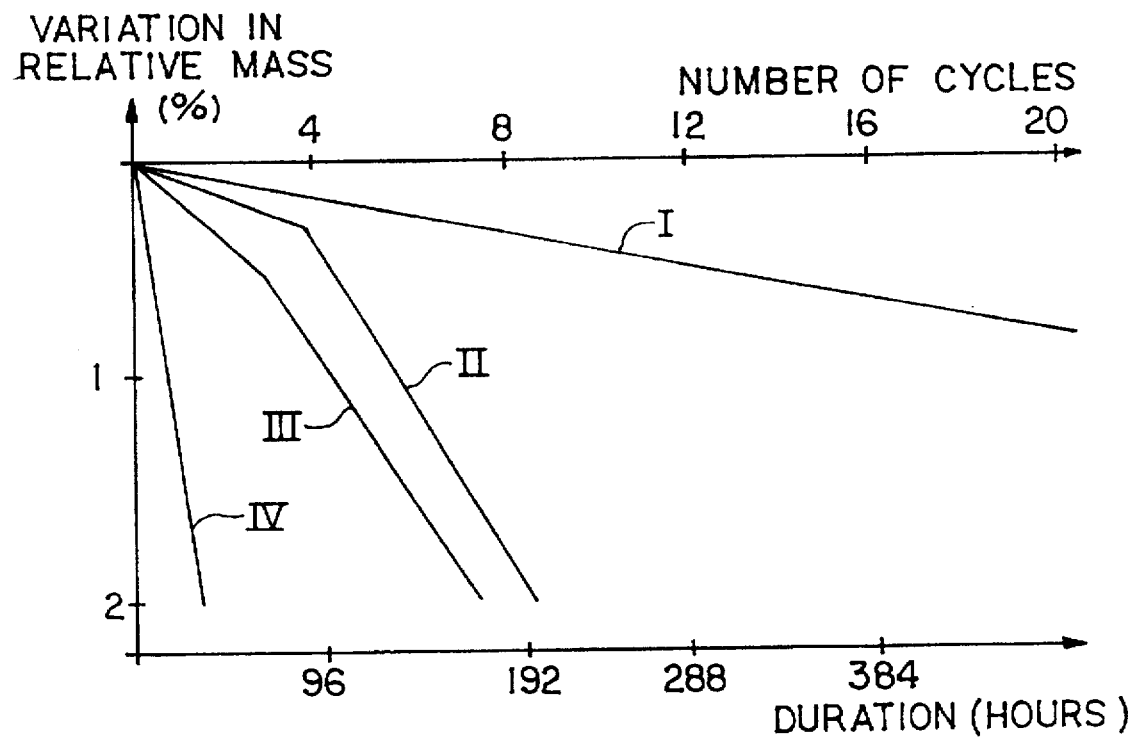
FIG. 1 shows how the relative mass of composite materials varies as a function of number of aging cycles in air at high temperature to which the materials are subjected.

The following examples all relate to products made of ceramic matrix composite materials, and in particular materials having an SiC matrix, and they are intended more particularly for use at relatively high temperatures which constitutes a field of application where the method of the invention is particularly suitable. Such materials generally present residual open pores constituting porosity of about 10% by volume.

EXAMPLE 1

A C—Sic type composite material product was made by implementing a method comprising the following steps:

formation of a preform or fiber reinforcing structure by stacking layers of carbon fiber cloth;

vapor infiltration of an intermediate coating of pyrolytic carbon on the fibers in the layers of cloth while held in tooling; and vapor infiltration of a silicon carbide matrix within the pores of the preform already provided with its interphase coating of pyrolytic carbon.

Such a method is described in detail in French patent 84 11 591 (publication No. 2 567 874).

The product was subjected to treatment for protection against oxidation comprising a first impregnation stage in a vacuum using a liquid solution of sodium and potassium phosphates comprising 30% sodium phosphate and 10% potassium phosphate (by weight) the remainder being water. Impregnation was performed by immersing the product in a bath of said solution under a pressure of about 30 torrs ($4 \times 10^3$ N/m2) for a period of about 1 hour. After returning to atmospheric pressure, dewatering, and drying, the product was subjected to heat treatment for several hours in an inert atmosphere (N2) with temperature being raised progressively up to a value lying in the range 350° C. to 950° C., followed by a pause at the high temperature, prior to returning to ambient temperature, so as to implement "lining" (vitrification) of the internal coating, thus making it relatively insensitive to water.

In accordance with the invention, an external coating for protection against oxidation was then formed by spray-painting or by brush application of a liquid composition containing a mixture of phosphates, of silica, and of alumina, in suspension in water. In particular, the composition further included various oxides and its composition was as follows: 35% by weight of $P_2O_5$, 30% by weight alumino-silicate, 20% by weight alkali oxides, 2% by weight boron oxide $B_2O_3$, 6% by weight metallic oxides, and 7% water (quantity of water contained in the composition in its initial state and which can be measured by weight loss on heating).

After being dried at 100° C., the product was subjected to intermediate heat treatment at a temperature of about 250° C. for 1 hour, thereby providing an external coating in the form of a cement that is insoluble in water. The cement is formed by condensation of poly-phosphate chains and not by pure hydraulic bonds. The external coating was securely held in the surface pores of the product, with spray-painting or application by means of a brush and the liquid nature of the composition contributing to penetration thereof into the surface pores.

Although the product can be used in that state, in the present example it was subjected to additional heat treatment to a higher temperature lying in the range 800° C. to 1000° C. (e.g. equal to about 900° C.), and in an inert atmosphere (e.g. nitrogen) to cause the cement to melt and be transformed into a self-sealing glass. It may be observed that it is also possible to pass directly to this stage without an intermediate pause of moderate heat treatment.

The composite material product obtained in this way has internal protection lining the surfaces of the internal pores that were initially accessible inside the composite material, and external protection lining the surface of the product.

Samples of the protected product were subjected to successive aging cycles in air, each comprising heating to a temperature of 600° C., being maintained at said temperature for a period of 4 hours, reducing the temperature to 450° C., maintaining said temperature for 18 hours, and then returning to ambient temperature (cycle C).

Curve I in FIG. 1 shows variation in mass loss as measured on the samples as a function of the number of aging cycles to which they were subjected, the samples being placed in boiling water for a period of 1 hour prior to the cycles of aging in air.

Samples of the product provided solely with the internal protection were placed in boiling water for 1 hour and then subjected to the same C cycles of aging in air. Curve II in FIG. 1 shows the variation in mass loss as measured as a function of number of cycles.

EXAMPLE 2

The procedure was the same as in Example 1, with the exception of forming internal protection.

Samples of the resulting product, provided with external protection only, were subjected to the same cyclic aging test as in Example 1 (cycles C).

Curve III in FIG. 1 shows the variation in mass loss as measured on the samples of product obtained in that way and as a function of number of aging cycles. The results were the same regardless of whether the samples had been placed in boiling water for 1 hour prior to cyclic aging, thereby showing the insensitivity to water of the external protection.

By way of comparison, curve IV in FIG. 1 shows variation in mass loss as measured on samples of the product made of the initial composite material but having no protection against oxidation.

FIG. 1 shows the excellent effectiveness of protection against oxidation as provided by the external coating when associated with the internal coating (curve I).

EXAMPLE 3

A product made of a C—SiC composite material was made as described in Example 1, with both internal and external protection against oxidation. After being immersed in boiling water for 1 hour, the resistance of the product to oxidation was evaluated by an aging test, in air performed on test pieces subjected to 4-point bending stress under a loading of 150 MPa, for times of 100 hours or 200 hours and under temperatures of 450° C. or 600° C. The residual value, after aging, of the bending strength RF was subsequently measured at ambient temperature.

The results obtained are given in Table I. The table also shows the initial bending strength at ambient temperature of the unprotected product. By way of comparison, the same test performed on a non-protected test piece of the composite material product led to the test piece breaking after about 40 hours.

TABLE I

| Internal protection | External protection | Aging in air under stress | | | | $R_F$ (MPa) |
|---|---|---|---|---|---|---|
| | | T° (C.) | Stress (MPa) | Duration (h) | Observation | |
| no | no | — | — | — | | 270 |
| no | no | 450 | 150 | 40 | break | — |
| yes | yes | 450 | 150 | 100 | no break | 260 |
| yes | yes | 450 | 150 | 200 | no break | 260 |
| yes | yes | 600 | 150 | 100 | no break | 260 |

From Table I it is clear that the protection against oxidation is effective.

EXAMPLE 4

A C—SiC composite material product was made as described in Example 1 with both internal and external protection against oxidation.

The resistance of the product to oxidation was evaluated by an oxidation test in air performed on test pieces subjected to cyclic mechanical stresses at temperatures of 450° C., 600° C., or 680° C., and for different numbers of cycles. The cycles consisted in applying a traction stress of 100 MPa in alternation with a compression stress of 100 MPa, with the exception of one test in which the cycle comprised applying a traction stress of 15 MPa followed by a further traction stress of 150 MPa. The frequency of the cycles was 2 Hz or 9 Hz. After aging, the residual value of the traction strength RT was then measured after returning to ambient temperature.

The results obtained are given in Table II. The table also gives the initial traction strength at ambient temperature of the non-protected product. By way of comparison, the same test was performed on a test piece of a product made of composite material provided with internal protection and with external protection as described in document FR-A-2 640 619. The test piece was observed to brake after $2\times10^4$ cycles.

TABLE II

| Internal protection | External protection | T (°C.) | Traction (+) compression (−) | Frequency (Hz) | No. of cycles | Observation | $R_T$ (MPa) |
|---|---|---|---|---|---|---|---|
| no | no | | | | | | 350 |
| according to FR-A-2 640 619 | | 600 | +100 MPa −100 MPa | 2 | $2 \times 10^4$ | break | — |
| yes | yes | 450 | +100 MPa −100 MPa | 2 | $5 \times 10^5$ | no break | 340 |
| yes | yes | 600 | +100 MPa −100 MPa | 2 | $1.6 \times 10^5$ | no break | 340 |
| yes | yes | 680 | +100 MPa −100 MPa | 9 | $10^6$ | no break | 350 |
| yes | yes | 450 | +15 MPa −150 MPa | 9 | $10^6$ | no break | 360 |

Like Table I, Table II shows the effectiveness of the protection achieved against oxidation.

EXAMPLE 5

A product made of SiC—SiC composite material having a pyrolytic carbon interphase was made implementing a method comprising the following steps:
- formation of a preform or fiber reinforcing structure by stacking layers of fiber cloth essentially made of silicon carbide, e.g. fibers as sold under the name "Nicalon" by the Japanese company Nippon Carbon Co.;
- vapor infiltration of an interphase intermediate coating of pyrolytic carbon onto the fibers of the preform while held in tooling; and
- vapor infiltration of a silicon carbide matrix into the pores of the preform provided with the pyrolytic carbon interphase coating.

The product was then subjected to treatment to provide protection against oxidation as described in Example 1 (internal protection and external protection).

The resistance of the product to oxidation was evaluated by oxidation tests in air performed on test pieces subjected to creep fatigue cycles (cycle A) or traction cycles (cycle B) at a temperature of 500° C. or 850° C. and for various numbers of cycles. The residual traction strength RT was then measured at ambient temperature.

Figure 2:
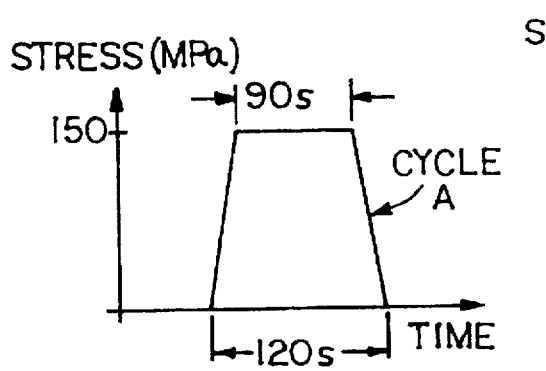
FIGS. 2 and 3 show the changes in the stresses applied to parts made of composite material and subjected to tests for withstanding oxidation at high temperature under mechanical stress.

As shown in FIG. 2, cycle A concerning mechanical creep fatigue comprise applying a traction stress of 150 MPa for a duration of 90 s, with the stress increasing from 0 to 150 MPa uniformly from the beginning of the cycle over 15 s and decreasing at the end of the cycle, likewise uniformly over a period of 15 s down to the value 0.

Figure 3:
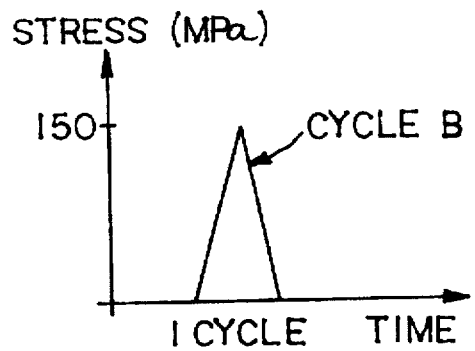

As shown in FIG. 3, cycle B of mechanical fatigue in traction consisted in applying a traction stress "pulse" having a maximum value equal to 150 MPa with the cycles being at a frequency of 20 Hz.

The results obtained are given in Table III. The table also shows the initial value of traction strength as measured on an unprotected sample of the product. By way of comparison, the same tests were performed on test pieces of the product protected using the method of document FR-A-2 640 619 which led to breakage after 50 cycles A at 850° C., 100 cycles A at 550° C., and 103 cycles B at 850° C.

TABLE III

| Internal protection | External protection | Cycle | T (°C.) | No. of cycles | Duration (h) | Observation | $R_T$ (MPa) |
|---|---|---|---|---|---|---|---|
| no | no | — | — | — | — | — | 200 |
| according to FR-A-2 640 619 | | A | 550 | 100 | 3 | break | |
| according to FR-A-2 640 619 | | A | 850 | 50 | 1.5 | break | |
| yes | yes | A | 550 | 2700 | 87 | no | 200 |

TABLE III-continued

| Internal protection | External protection | Cycle | T (°C.) | No. of cycles | Duration (h) | Observation | $R_T$ (MPa) |
|---|---|---|---|---|---|---|---|
| yes | yes | A | 850 | 2700 | 87 | break no break | 200 |
| according to FR-A-2 640 619 | | B | 850 | $10^3$ | 0.01 | break | |
| yes | yes | B | 850 | $1.7 \times 10^6$ | 23 | no break | 200 |

EXAMPLE 6

In order to evaluate the range over which the protection against oxidation as defined in the above examples is effective, a product was made of SiC—SiC composite material as described in Example 5. It was provided with internal protection against oxidation as in Example 1 and with external protection formed by applying two layers by brushing or by spraying. The first layer was made using the same impregnation solution (liquid solution of phosphates of sodium and of potassium) as was used for the internal protection. The second layer was made from the composition constituted mainly by a mixture of phosphates, of silica, and of alumina, as used for making the external protection of Example 1. The total thickness of the two layers together lay in the range 50 microns to 100 microns.

The resistance of the product protected in that way was evaluated by an oxidation test in air performed on test pieces subjected to fatigue cycles identical to cycle A in Example 5 (FIG. 2) at temperatures of 450° C. and of 1100° C. and for various numbers of cycles. The residual value of the traction strength RT was then measured at ambient temperature on test pieces that had not already broken.

The results obtained are given in Table IV. By way of comparison, the same test was performed at 450° C. on a test piece of product protected using the method of document FR-A-2 640 619 and that led to the test piece breaking after 400 cycles; at 1100° C., breakage took place after 150 cycles.

The last line of Table IV shows that the test piece of protected product broke. However, that breakage took place at a very high temperature and after a number of cycles that was ten times greater than required for the product protected in accordance with document FR-A-2 640 619.

We claim:

1. A method of providing protection against oxidation for a product made of a composite material containing carbon and a ceramic surface, protection being provided by at least one liquid composition capable of leaving a refractory residue that is non-oxidizing and self-sealing, the method being characterized in that it comprises at least the steps consisting of:

forming on the ceramic surface of the product at least one external coating by means of a composition consisting essentially of a mixture of phosphates, of silica, and of alumina, and belonging to a $P_2O_5$—$SiO_2$—$Al_2O_3$ system; and after drying, performing a heat treatment at a temperature that is sufficient at least to transform the external coating into an insoluble cement capable of forming a self-sealing glass.

2. A method according to claim 1, characterized in that the external coating is formed by spray-painting a liquid suspension containing said mixture of phosphates, of silica, and of alumina.

3. A method according to claim 1, characterized in that the external coating is formed by using a brush to apply a liquid suspension containing said mixture of phosphates, of silica, and of alumina.

TABLE IV

| Internal protection | External protection | Cycle | T (°C.) | No. of cycles | Duration (h) | Observation | $R_T$ (MPa) |
|---|---|---|---|---|---|---|---|
| no | no | | | | | — | 200 |
| according to FR-A-2 640 619 | | A | 450 | 400 | 12 | break | — |
| yes | yes | A | 450 | 2700 | 87 | no break | 200 |
| according to FR-A-2 640 619 | | A | 1100 | 150 | 4.5 | break | — |
| yes | yes | A | 1100 | 1720 | 55 | break | — |

Tables III and IV show the effectiveness of the protection against oxidation on products made of SiC—SiC composite material having a pyrolytic carbon interphase.

4. A method according to claim 1, characterized in that in said mixture of phosphates, of silica, and of alumina, the ratio by weight of $SiO_2$ over $P_2O_5$ lies in the range of 0.35 to 0.45, the ratio by weight of $Al_2O_3$ over $P_2O_5$ lies in the range 0.40 to 0.55, and the ratio by weight of $SiO_2$ over $Al_2O_3$ lies in the range 0.6 to 1.

5. A method according to claim 1, characterized in that the composition also contains refractory oxides.

6. A method according to claim 1, characterized in that the heat treatment is continued at a higher temperature to transform the insoluble cement into a self-sealing glass.

7. A method according to claim 1, characterized in that the heat treatment is performed at a temperature that is sufficient to transform the external coating into a self-sealing glass.

8. A method according to claim 1, characterized in that prior to forming the external coating, the method comprises a step that consists of impregnating the product within residual open pores of the composite material by means of a liquid solution of at least one alkali phosphate.

9. A method according to claim 8, characterized in that the method includes implementing a heat treatment at a temperature that is sufficient for the surfaces of the pores in the impregnated composite material to be lined with an internal protective coating that is refractory, non-oxidizing, and self-sealing.

10. A method according to claim 8, characterized in that the product is impregnated by means of a liquid solution of phosphates, of sodium, and of potassium.

11. A method according to claim 1:
characterized in that the external coating is formed in step selected from the steps of spray-painting a liquid suspension containing said mixture of phosphates, of silica, and of alumina or using a brush to apply a liquid suspension containing said mixture of phosphates, of silica, and of alumina;
characterized in that in said mixture of phosphates, of silica, and of alumina, the ratio by weight of $SiO_2$ over $P_2O_5$ lies in the range of 0.35 to 0.45, the ratio by weight of $Al_2O_3$ over $P_2O_5$ lies in the range of 0.40 to 0.55, and the ratio by weight of $SiO_2$ over $Al_2O_3$ lies in the range 0.6 to 1;
characterized in that the composition also contains refractory oxides;
characterized in that the heat treatment is performed at a temperature that is sufficient to transform the external coating into a self-sealing glass;
characterized in that prior to forming the external coating, the method comprises a step that consists of impregnating the product within residual open pores of the composite material by means of a liquid solution of at least one alkali phosphate;
characterized in that the method includes implementing a heat treatment at a temperature that is sufficient for the surfaces of the pores in the impregnated composite material to be lined with an internal protective coating that is refractory, non-oxidizing, and self-sealing;
characterized in that the product is impregnated by means of a liquid solution of phosphates, of sodium, and of potassium.

12. A method according to claim 1, wherein the heat treatment is performed at a temperature that is sufficient at least to transform the external coating into an insoluble cement capable of forming a self-sealing glass in a temperature range from 450° C. to 1100° C.

13. A product made of a composite material containing carbon and protected against oxidation by an external coating that is refractory and non-oxidizing, the product being characterized in that the coating is constituted by a cement that is insoluble in water and that is formed of a composition consisting essentially of a mixture of phosphates, of silica, and of alumina.

14. A product according to claim 13, characterized in that the product further includes internal protection against oxidation by an impregnated mixture of phosphates, of sodium, and of potassium.

15. A product according to claim 13, wherein the external coating is self-sealing in a temperature range from 450° C. to 1100° C.

16. A product according to claim 13, characterized in that in said mixture of phosphates, of silica, and of alumina, a ratio by weight of $SiO_2$ over $P_2O_5$ lies in the range of 0.35 to 0.45, a ratio by weight of $Al_2O_3$ over $P_2O_5$ lies in the range of 0.40 to 0.55, and a ratio by weight of $SiO_2$ over $Al_2O_3$ lies in the range of 0.6 to 1.

17. A product according to claim 13, characterized in that in said mixture of phosphates, of silica, and of alumina, a ratio by weight of $SiO_2$ over $P_2O_5$ lies in the range of 0.35 to 0.45, a ratio by weight of $Al_2O_3$ over $P_2O_5$ lies in the range of 0.40 to 0.55, and a ratio by weight of $SiO_2$ over $Al_2O_3$ lies in the range of 0.6 to 1.

18. A product made of a composite material containing carbon and protected against oxidation by a vitreous external coating that is self-sealing, the product being characterized in that the coating is constituted by a silica glass that is formed of a composition consisting essentially of a mixture of phosphates, of silica, and of alumina.

19. A product according to claim 18, wherein the vitreous external coating is self-sealing in a temperature range from 450° C. to 1100° C.

20. A method of providing protection against oxidation for a product made of a composite material containing carbon and having an external layer with a ceramic surface, protection being provided by at least one liquid composition capable of leaving a refractory residue that is non-oxidizing and self-sealing, the method being characterized in that it comprises at least the steps consisting of:

forming on the ceramic surface at least one external coating by means of a composition consisting essentially of a mixture of phosphates, of silica, and of alumina, and belonging to a $P_2O_5$—$SiO_2$—$Al_2O_3$ system; and after drying, performing a heat treatment at a temperature that is sufficient at least to transform the external coating into an insoluble cement capable of forming a self-sealing glass.

* * * * *